UNITED STATES PATENT OFFICE.

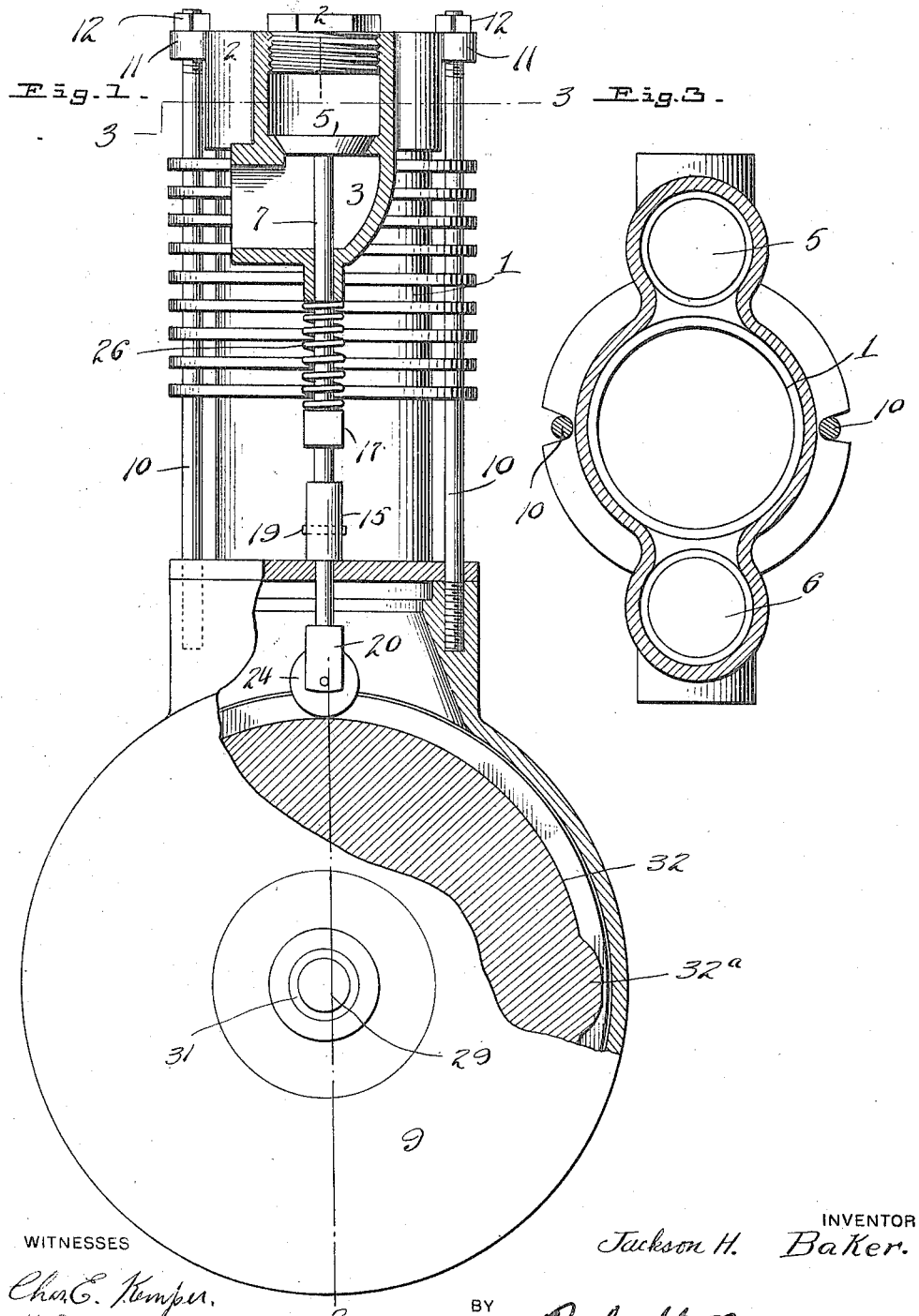

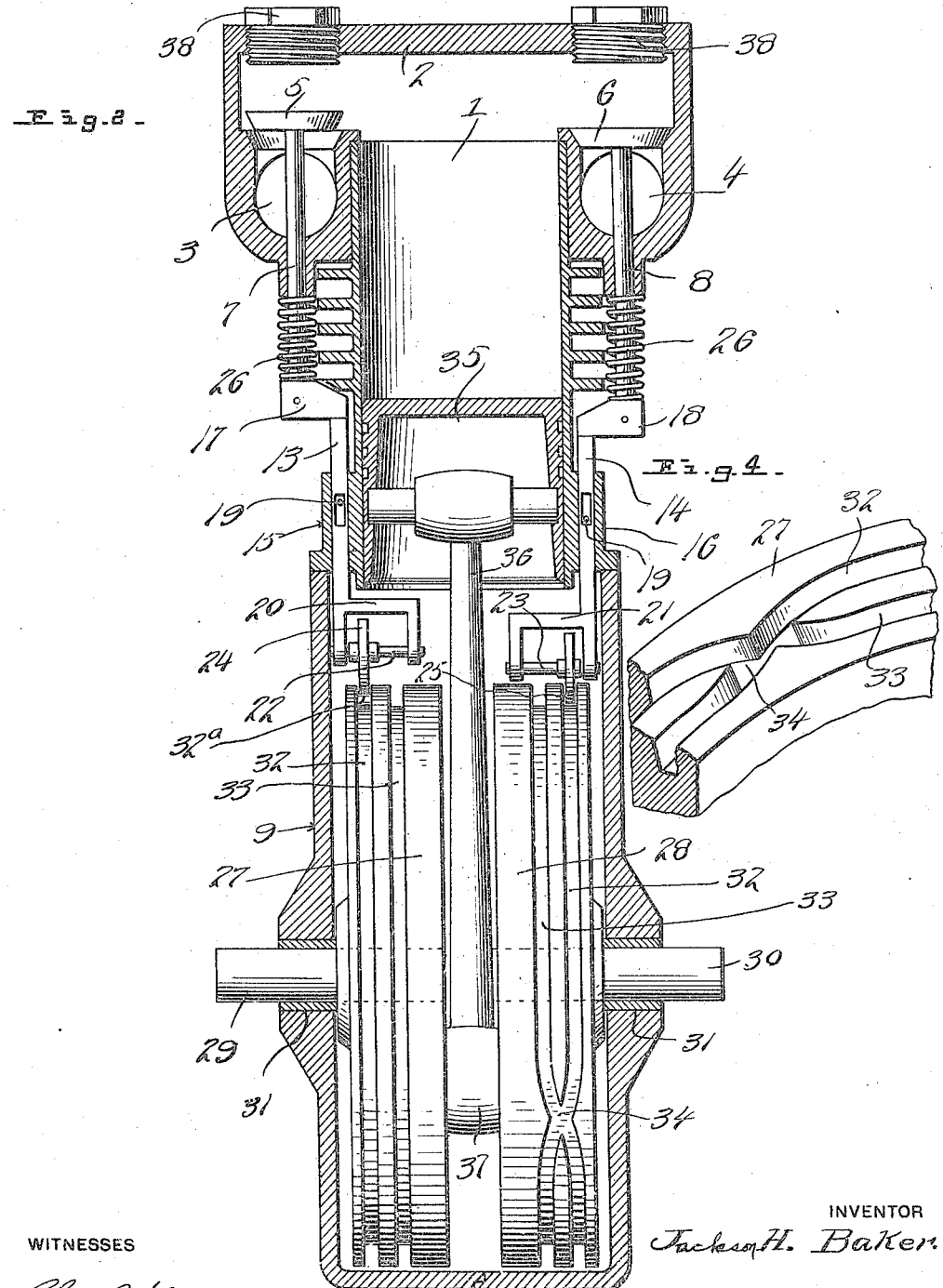

JACKSON H. BAKER, OF OTTUMWA, IOWA.

INTERNAL-COMBUSTION ENGINE.

1,248,597.  Specification of Letters Patent.  Patented Dec. 4, 1917.

Application filed May 5, 1916.  Serial No. 95,683.

*To all whom it may concern:*

Be it known that I, JACKSON H. BAKER, a citizen of the United States, residing at Ottumwa, in the county of Wapello and State of Iowa, have invented certain new and useful Improvements in Internal-Combustion Engines, of which the following is a specification.

This invention has relation to internal combustion engines, and the nature and objects thereof will be readily understood by those skilled in the art to which it appertains, in the light of the following explanation of the accompanying drawings, illustrating, what I now believe to be the preferred embodiment or mechanical expression of my invention from among other forms and arrangements within the spirit thereof, or the scope of the appended claim.

However, an object of the invention is to provide an internal combustion engine of the four-cycle type, having a new and novel means for actuating the inlet and exhaust valves at proper intervals.

In addition to the foregoing my invention comprehends improvements in the details of construction and arrangement of parts to be hereinafter described and particularly pointed out in the appended claim.

In the accompanying drawings, in which similar and corresponding parts are designated by the same characters of reference throughout the several views in which they appear:

Figure 1 is a view in side elevation, partly broken away of an internal combustion engine embodying my invention.

Fig. 2 is a vertical sectional view taken on the line 2—2 of Fig. 1.

Fig. 3 is a horizontal section on the line 3—3 of Fig. 1, and

Fig. 4 is a view in perspective of a portion of one of the cams.

With reference to the drawings, 1 indicates the cylinder of an internal combustion engine, provided with a cylinder head 2, having intake and exhaust ports 3 and 4 respectively controllable by valves 5 and 6. The valves are mounted upon stems 7 and 8, which are vertically movable in guides, and project below their respective valve casings somewhat after the manner of the usual type of four-cycle automobile engine. The valves however are preferably disposed at diametrically opposite points of each side of the cylinder.

A crank casing 9 is provided and is substantially circular in side elevation, and is removably secured to the cylinder by means of bolts 10 having threaded engagement in the edge of the crank case. The bolts 10 are disposed parallel with the cylinder and at each side thereof, and extend through apertured lugs 11 on the cylinder head with nuts 12 at the outer ends of the bolts for clamping the cylinder heads tightly to the upper end of the cylinder. In this manner, a single fastening means is employed to retain the parts in assembly.

Vertically reciprocable rods 13 and 14 are mounted at opposite sides of the cylinder and in suitable guides 15 and 16, the upper ends of said rods being connected to the lower ends of the valve stems by means of off-set portions 17 and 18. The rods 13 and 14 are vertically slotted to receive stop pins 19 whereby reciprocable movement of the rods is limited by engagement of the ends of the slots with the pins. The lower ends of the rods 13 and 14 are provided with angular arms or extensions 20 and 21, the ends of the rods and the angular extensions being provided with transversely alined apertures. Shafts 22 and 23 are journaled in said apertures, for the support of rollers 24 and 25, which are rotatable and longitudinally slidable on said shafts. Coil springs 26 may be provided around the valve stems and disposed between the off-set portions 17 and 18 and the valve casings for normally retaining the valves in seated position, and for assisting the rollers 24 and 25 in the performance of their functions, in a manner to be presently noted.

For actuating the valves at proper intervals I provide circular cams 27 and 28 within the crank casing and rotatably mounted by means of shafts 29 and 30 centrally fixed to the cams, and extended in opposite directions through central bearings 31 in the sides of the casing. The periphery of each cam is further provided with a pair of parallel grooves 32 and 33, which grooves however are intersecting, or crossed at one point on the periphery of each cam, indicated at 34. The cams are so disposed as to permit the engagement of the rollers 24 and 25 in the grooves therein.

The cylinder is provided with the usual reciprocating piston 35, having a pitman 36 which is pivotally connected at its free end to a wrist pin 37, which pin is disposed in the space between the cams, and eccentrically mounted therein. The cams are thus rotatable in unison under the influence of the pitman during the operation of the engine.

While I have indicated the valves 5 and 6 as intake and outlet or exhaust valves respectively, it is obvious that the valves 6 may perform the functions of an intake, and the valve 5, the exhaust but for the purpose of illustration the valves are utilizable as first mentioned, and the operation of the engine is therefore as follows:—

During the intake stroke of the engine, the roller 24 is preferably disposed in the outer, or groove 32, and in engagement with a radial enlargement 32$^a$ in said groove whereby the rod 13 is vertically moved and the valve 5 consequently opened during the downward stroke of the piston, and permitting the entrance of the charge. At the beginning of the return or compression stroke, the cam 27 will have rotated sufficiently to move the enlargement 32$^a$ out of engagement with the roller 24, thereby permitting the intake valve to be reseated. At the expiration of the compression stroke it will be obvious that the cam 27 will have completed one revolution, and now assuming the explosion to have taken place and the piston to be moving upon its working stroke, the roller 24 becomes engaged in the point of intersection of the cam grooves, whereby said roller is longitudinally moved upon its shaft and engaged in the adjoining cam groove 33, which is uninterrupted throughout its circumference. It will be obvious that during the working and the return, or exhaust stroke the valve 5 will remain seated owing to the engagement of the roller 24 in the smooth cam groove 33.

However, during the exhaust stroke, the roller 25 will be in engagement with the groove 33 of the cam 28, which groove is provided with an enlargement similar to the enlargement 32$^a$, whereby the exhaust valve 6, will be retained in open position to permit the exit of the burnt gases. At the time of the intake and compression strokes previously mentioned, the roller 25 was engaged in the cam groove 32 of its corresponding cam, said groove being uninterrupted throughout its circumference, the exhaust valve was retained in close position. Therefore by this arrangement each valve is only actuated at alternate revolutions of the crank shafts 29 and 30, or the cams.

The cams 27 and 28 are sufficiently weighted to perform the functions of fly wheels also, and if the lubricating system is to be of the splash type, the rotation of said cams will agitate the oil contained in the crank basin and distribute the same to all working parts interiorly of the engine. By providing threaded plugs 38 in the cylinder head and in alinement with the valves, said valves may be rendered accessible for regrinding by removing said plugs.

Thus it will be seen I have provided a novel form of internal combustion engine wherein the valves may be positively actuated and at the proper intervals, and the relation of the cams when once established will continue to operate the valves without attention or readjustment.

While I have illustrated and described my invention with some degree of particularity, I realize that in practice various alterations thereover may be made for the purpose of employing the principles therein presented, and I therefore reserve the right and privilege of changing the form of the details of construction, or otherwise altering the arrangement of the correlated parts without departing from the spirit of the invention, or the scope of the appended claims.

Having thus fully described my invention what I claim as new and desire to secure by Letters Patent is:—

In an internal combustion engine, the combination of a reciprocable valve, a crank shaft, a disk on said crank shaft having a pair of peripheral grooves intersected at a point in their circumference, a radial enlargement formed in one groove, a reciprocable rod for moving the valve with the inner end of said rod disposed in proximity to the periphery of the disks and having an aperture, a lateral extension on said apertured end of the rod, said extension having an apertured alinement with the first mentioned aperture, a shaft mounted in said aperture, a roller slidably mounted on said shaft for engagement in the grooves of the disk, the first mentioned apertured end of the rod being disposed adjacent the groove having the radial enlargement whereby when the roller is in said groove engagement of the enlargement with the roller may take place when said roller is closely adjacent the first mentioned apertured end of the rod.

In testimony whereof I affix my signature in presence of two witnesses.

JACKSON H. BAKER.

Witnesses:
JOHN D. VAUGHAN,
GUY N. REID.